United States Patent [19]
Kunzmann

[11] Patent Number: 5,456,291
[45] Date of Patent: Oct. 10, 1995

[54] CONDUIT METALLIC KNIT ELEMENT FOR EXHAUST GAS SYSTEMS

[75] Inventor: Thomas Kunzmann, Walzbachtal, Germany

[73] Assignee: IWK Regler Und Kompensatoren GmbH, St. Utensee, Germany

[21] Appl. No.: 342,033

[22] Filed: Nov. 17, 1994

Related U.S. Application Data

[63] Continuation of Ser. No. 814,691, Dec. 30, 1991, abandoned, which is a continuation of Ser. No. 239,391, Sep. 1, 1988, abandoned.

[30] Foreign Application Priority Data

Sep. 1, 1987 [DE] Germany ............... 37 29 147.5

[51] Int. Cl.⁶ .................................................. F16L 11/00
[52] U.S. Cl. .................. 138/121; 138/103; 138/124; 138/110; 138/173; 181/207; 60/320
[58] Field of Search .................. 138/26, 103, 121, 138/122, 110, 172, 173, 177, 178, 147, 127, 124, 125, 126, 127; 181/207, 208, 227; 60/320, 322

[56] References Cited

U.S. PATENT DOCUMENTS

| | | | |
|---|---|---|---|
| 4,793,384 | 12/1988 | Lalikos et al. | 138/121 |
| 4,854,416 | 9/1989 | Lalikos et al. | 181/207 |
| 4,867,269 | 9/1989 | Lalikos et al. | 181/227 |

*Primary Examiner*— James E. Bryant, III
*Attorney, Agent, or Firm*—Antonelli, Terry, Stout & Kraus

[57] ABSTRACT

In order to obtain optimum absorption and compensation of relative movements in an exhaust gas system while at the same time avoiding a transmission of movement and the occurrence of a resonance phenomena, a conduit element is proposed having a bellows and a metallic braided or knit jacket. The bellows is fashioned as a highly flexible bellows with an all around absorption of movement. The jacket is applied to the bellows so that the jacket solely follows substantially the wave crests of the bellows.

14 Claims, 2 Drawing Sheets

CONDUIT METALLIC KNIT ELEMENT FOR EXHAUST GAS SYSTEMS

FIELD OF THE INVENTION

The invention relates to a conduit element for exhaust gas systems for the compensation of relative movements, with a bellows and a jacket of a braided or knit material.

BACKGROUND OF THE INVENTION

Such a conduit element has been known basically from DOS 3,219,360. The element comprises a self-supporting, relatively stiff corrugated exhaust gas pipe which can be denoted as being merely semiflexible. The conventional corrugated exhaust gas pipe can absorb movements perpendicularly to the axial direction only in a very limited way. This pipe has a natural resonance of above 1000 Hz lying above the customary frequencies of the systems producing the exhaust gases, such as of a motor, especially an automotive vehicle engine, with an excitation frequency of usually below 200 Hz. Excitation of the engine is evoked primarily by engine masses (pistons, connecting rods, etc.) moved by unbalanced, oscillating inertial forces. These oscillating inertial forces of the second order, responsible for excitation of the bellows, change with double the number of revolutions of the engine. The wall thicknesses of such stiff corrugated exhaust gas pipes are larger than 0.5 mm and preferably range around 1 mm hereby the high rigidity results.

Furthermore, the conventional, relatively stiff conduit element, denoted as being semiflexible, exhibits a jacket of a metallic braiding, woven material, or knit material following the contour of the waves of the corrugated pipe along the wave flanks, in order to damp the high-frequency, high-pitched, metallically clanging noises occurring due to pulsating currents when using such conduit elements in exhaust gas conduits of automotive vehicles, since, as set forth by the reference, the wave flanks are allegedly responsible, above all, for the development of noises in that these flanks begin to vibrate under the high-frequency excitation by the pulsating flow, in a similar manner as diaphragms.

These conventional conduit elements, as set forth above, exhibit high rigidity and therefore are unsuitable for the absorption and compensation of all-around movements, as they occur in such exhaust gas systems utilized particularly in motor vehicles.

SUMMARY OF THE INVENTION

The invention is based on the object of providing a conduit element which, with high thermal stress capacity, affords a high, optimal, all-around motion absorption while avoiding resonant oscillations based on engine excitation.

According to the invention, the aforementioned object has been attained by a conduit element of the type mentioned above which is characterized in that the bellows is a highly flexible bellows with all-around absorption of movements, and the jacket is applied thereon following solely essentially the wave crests of the bellows.

The invention initially uses a highly flexible bellows having all-around movability, optimized with a view toward maximum all-around movability which, on account of its structure per se, exhibits natural resonant frequencies in the range of typical engine frequencies below 200 Hz, especially between 150 and 200 Hz. An attempt at displacing the natural frequencies by a different installation of the bellows proper results in a reduction of movability as inherent in the conventional conduit elements. In the same way, the movability would be reduced if a knit or braided jacket were to be applied over the entire undulations of the bellows, especially along the flanks; this holds true to an increased extent with respect to the mounting of perforated plates along the flanks, also provided, inter alia, in the state of the art. It has been found surprisingly by the invention that the mounting of a braided or knit jacket following solely the wave crests, in such a highly flexible bellows with all-around movement absorption, displaces, on the one hand, the resonant frequency and, in particular, moves the latter out of the range of the engine frequency, but, on the other hand, practically does not limit the mobility of the bellows. A displacement of the resonant frequency occurs to 1.2 to 1.4 times the initial resonant frequency, which is fully adequate for practical purposes, wherein the high movability of the bellows employed is not impeded.

The invention provides a structurally rigid connection of the bellows undulations by means of the knit or braided jacket. In the manufacturing process, the knit jacket is adapted in its diameter to the outer diameter of the wave crests, is pulled over the bellows, and is then preferably slightly indented into the wave troughs so that it is molded onto the wave crests of the bellows and therefore enters into a shape-mating connection with the latter. Just as in case the wall thickness of the bellows proper were to be enlarged, an application of the knit jacket to the flanks of the bellows would adversely alter the bending resistance under alternating stress and thus the alternating load characteristic, and would increase the dangers of rupturing.

Such typical, highly flexible bellows utilized according to this invention, for an exhaust gas conduit of a motor vehicle with the indicated resonant frequency exhibit, with wall thicknesses of less than 0.5 mm, a weight in the range of less than 200 g and an axial elasticity constant (total spring rate of the bellows) of between 5 and 20 N/mm.

A preferred embodiment provides that the bellows exhibits bellows undulations of differing rigidity, the bellows having, in particular, a barrel-shaped enveloping curve. In this embodiment, due to the knit jacket, a connection is established of waves having a higher axial rigidity with waves having a softer axial stiffness, which leads to a comparative increase in the axial rigidity of the entire composite structure. A highly flexible bellows exhibits a wall thickness of one wall layer of no more than 0.4 mm, preferably in the range of 0.20 to 0.3 mm. In case multiple-ply bellows are utilized, then the total thickness should not be above 0.5 mm and thus, especially in case of double-walled bellows, the individual wall thickness of each bellows ply should be no more than 0.25 mm.

The advantages attained by this invention can be improved by adaptation of the knit material. Thus, a further preferred embodiment provides that the jacket of knit material or braiding has a relatively small ratio of height to the mesh graduation of the braiding or knit material, wherein especially the ratio of the height to the mesh graduation of the braided or knit jacket is smaller than 1. Preferably, the ratio of height to graduation of each loop is in the range of 0.6 to 0.7. As a result, there is provided, on the one hand, an adequate rigidity in the peripheral direction and, on the other hand, the desired, adapted increase in axial rigidity of the composite structure. This rigidity is furthermore enhanced by the fact that the basically U-shaped loops of the knit or braided jacket have an indentation in the base of their U in that, therefore, a reverse undulation of the braided loops is provided. Thereby, with adequate axial rigidity of the knit jacket, dissolution of the meshwork in case of possible rupturing of wire is reliably precluded.

In order to cover at least each bellows undulation by a loop, a further embodiment provides that the extension (depending on alignment, the height H or the pitch T) of a loop in the direction of the axis of the bellows is no larger than the pitch of the bellows in correspondence with the axial central distance of two successive wave crests.

Additional advantages and features of the invention can be seen from the claims and from the following description wherein embodiments of the invention are explained in detail with reference to the drawings wherein:

DETAILED DESCRIPTION

Figure 1:
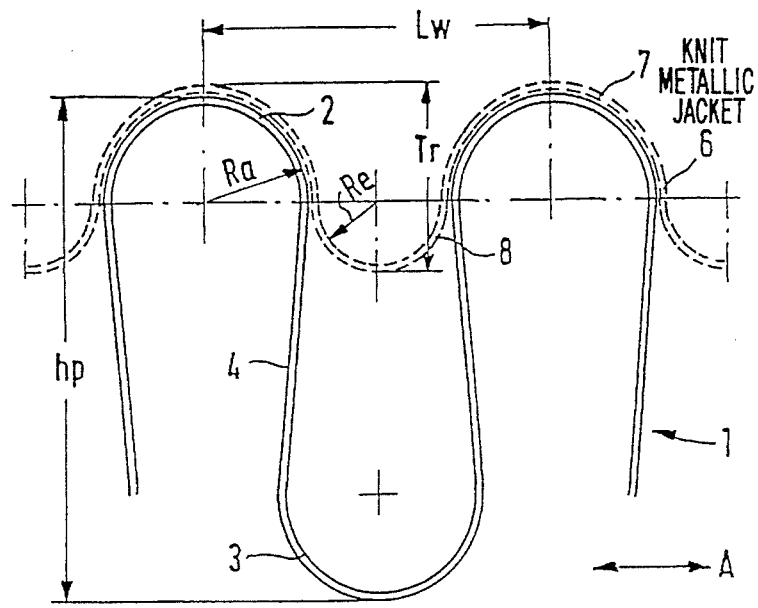
FIG. 1 shows a first schematic illustration of the subject of this invention.

The profile of a bellows 1 depicted in FIG. 1 shows, in alternating succession in axial direction A, wave crests 2 and wave troughs 3 joined by wave flanks 4. The bellows has a pitch of undulations Lw as a spacing between the center lines of two wave crests, and a profile height hp between the apices of the wave crest and of the wave trough. The wave crests and wave troughs 2, 3 exhibit an external radius of curvature Ra. As a jacket, a knit casing is applied to the wave crests 2, this jacket, in the illustrated sectional view, likewise exhibiting an undulating shape with wave crest 7 and wave trough 8. The knit casing 6 is applied to the bellows in such a way that it rests with its wave crest 7 firmly on the wave crest 2 of the bellows and follows same, but is detached from the bellows 1 in the transitional zone from wave crest 2 to the flank 4 of the bellows 1 so that the wave trough 8 of the knit jacket 6 has a finite distance from the wave trough 3 of the bellows 1. The knit Jacket thus has a total penetration depth Tr into the wave troughs between the wave troughs which is substantially smaller than the height of the bellows profile.

The important aspect resides in that the knit jacket 6, on the one hand, forms a dimensionally rigid connection with the bellows undulations in the region of the wave crests 2, 7, but is detached from the bellows 1 in the transitional zone of the undulations at the wave flanks 4 and is nowise in contact with the wave flanks 4. In case no wave flanks 4 are present, in special designs, then it is likewise important that the knit casing 6 is detached from the wall of the bellows 1 before the wave trough 3, i.e. contacts the bellows between the bellows undulations so that it does not follow the entire bellows contour and especially does not follow the wave flanks. The knit jacket 6 can preferably be applied to the bellows by manufacturing the jacket with a diameter corresponding to the outer contour of the bellows, pulling the jacket over the bellows, and thereafter rolling same into the intermediate zones between the wave crests 2 separately in the desired depth, the wave trough 8 of the jacket 6 being imparted with an indentation radius Re. The jacket 6 is retained on the bellows merely by the fact that the jacket follows the convex contour of the wave crests without being additionally attached with its ends to the ends of the bellows or to connecting pipes in a non-detachable and firm fashion, for example by welding. Thereby, a firm seat of the jacket 6 and a durable dimensional stability have been achieved.

Figure 2:
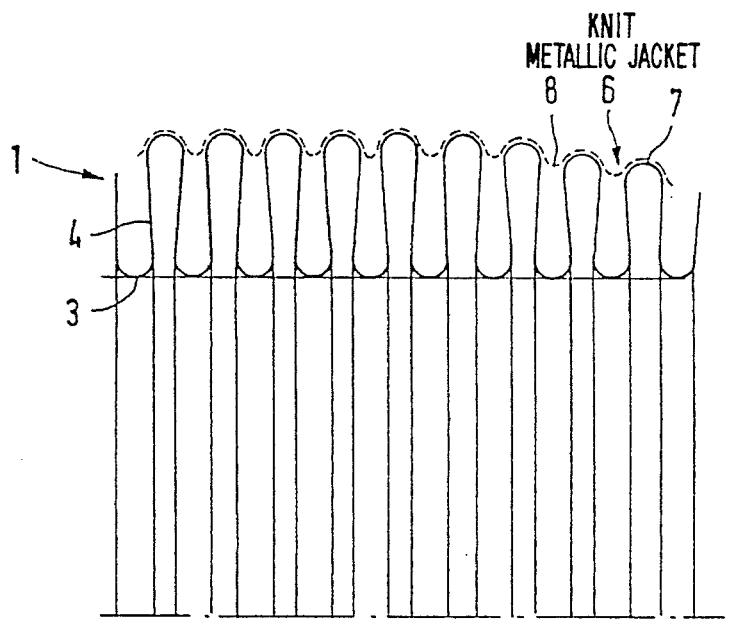
FIG. 2 shows another embodiment with undulations of differing axial rigidity.

In the preferred embodiment of FIG. 2, the undulations of the bellows have varying diameters wherein, more accurately, the bellows crests exhibit differing diameters whereas the bellows troughs have a diameter common to all of them. Thereby, a bellows is provided having differing axial rigidity of the individual undulations whereby the axial stiffness of the total composite structure is increased. Moreover, the seat and the dimensional stability of the applied braiding are additionally improved in such a bellows.

Figure 3:
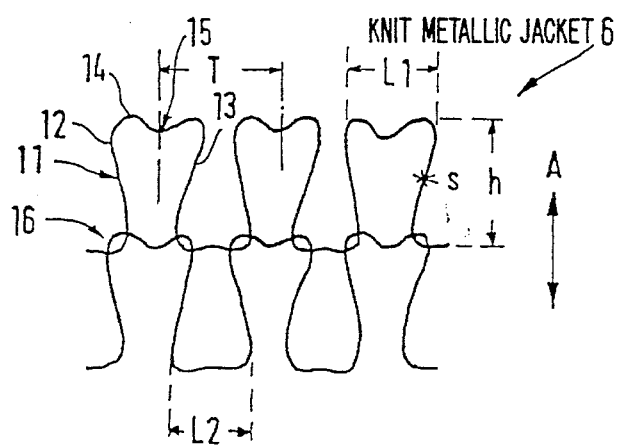
FIG. 3 shows a preferred embodiment of a braiding or knit material.

In the embodiment of FIG. 3, a preferred form of a braided or knit material is illustrated. The knit material 6 exhibits loops 11 having the shape of a U and, respectively, a double U, with respectively two U legs 12, 13 of each loop, and a U base 14. The U bases 14 are herein provided, in part, with an indentation 15 affording an improved interlocking (at point 16 of successive loops 11). The height of one loop is denoted by h. The upper and, respectively, lower width of a loop is denoted by L1 and L2, respectively, and the graduation of the meshwork 6 in the vertical direction with respect to the height h , defined as the spacing of a center of a loop to the center of the next-following, identically aligned U-shaped loop, is called T. The width of the loop in the region of the respective U base can vary for differently aligned U loops—which in each case follow one another in the graduation direction with alternating alignment. The knit jacket 6 is preferably applied to the bellows in such a way that the height h of the loops extends in the axial direction of movement, i.e. in parallel to the axis of the bellows.

In a concrete example, a bellows 1 was utilized in accordance with FIG. 2 having 9 wave crests exhibiting differing outer diameters of between 65 and 70 mm. The inner diameter of the wave troughs was uniformly about 50 mm. The installation length was about 45 mm. The bellows consisted of ferritic steel X 10 CrNiMoTi 18 10 material number 1.4571 according to DIN [German Industrial Standard] 17007, namely two-ply, the thickness of each ply being 0.15 mm. The weight of the bellows proper was 83 g. The bellows had an axial spring constant of 9.6 N/mm.

In correspondence with the varying outer diameter of the bellows over its length, the largest profile height of the bellows hp was 10 mm, the smallest one below 8 mm. The undulation pitch Lw was 4.6 mm with an external radius of curvature Ra of 1.3 mm.

To this bellows was applied a knit material having a width of 86 mm made up of a wire having a thickness of 0.32 mm of X 5 CrNi 18 9 steel having a material number of 1.4301 according to DIN 17007. The knit material had a mesh number of 30 over the width with a mesh graduation T of 5.7 mm with upper and lower mesh widths L1 and .L2, respectively, of 4.4 and 3.7 mm, respectively, as well as with a mesh height of 5 mm. The knit jacket had a total weight of 7.8 g with a longitudinal density of 82 g per meter.

Experiments showed a tensile strength of above 800N with an elongation at rupture of about 50%.

This knit material was applied to the wave crests 2 of the bellows 1 under a rolling-in radius Re of 0.9 mm to a penetration or indentation depth of 2.5 mm.

While the mere bellows 1, without knit material, showed a resonant frequency at 170 Hz, the total composite of bellows 1 and knit jacket 6, with a total weight of 90.8 g, had a resonant frequency at 210 Hz with a collective total bellows spring rate of 16 N/mm. This means an increase in resonance by the application of the knit jacket 6, having a weight of less than 10% of the bellows weight, according to this invention by 23% whereby, with the highly flexible bellows employed, optimized as such with respect to maximum all-around movability, the resonant frequency of the bellows, in the intended purpose of use, could successfully be distanced from the frequency of the engine.

Figure 4:
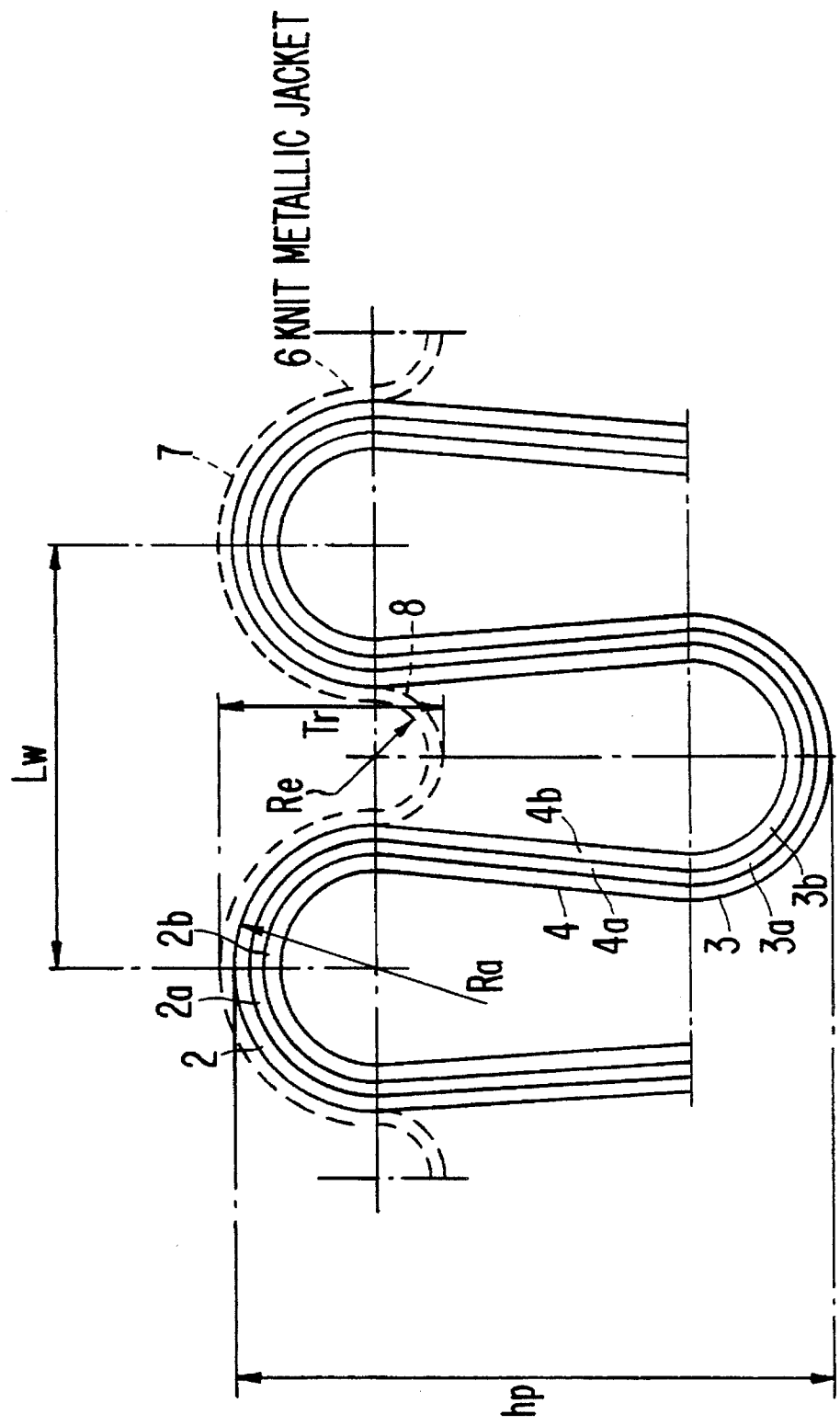
FIG. 4 is a schematic view of an alternate embodiment of the present invention.

As shown in FIG. 4, the bellows may be fashioned as a multiple wall bellows with the multiple walls of the bellows forming wave crests 2, 2a, 2b, wave troughs 3, 3a, 3b, and wave flanks 4, 4a, 4b.

I claim:

1. Conduit element for exhaust gas systems for compensation of relative movements, the conduit element comprising a flexible bellows capable of a universal absorption of movements and formed of a plurality of undulations including wave crest portions, wave trough portions between adjacent wave crest portions, and flank portions interconnecting the wave crest portions with adjoining wave trough portions, and a metallic knit jacket including wave crests and wave troughs disposed between said wave crests, said wave crests being disposed so as to follow the wave crest portions, with said wave troughs of said metallic knit jacket penetrating the wave trough portions of said bellows by a depth less than a depth of said wave trough portions of the bellows.

2. Conduit element according to claim 1 wherein: said bellows has undulations of varying rigidity.

3. Conduit element according to claim 1 wherein:

loops of the metallic knit jacket have a ratio of height to graduations less than 1.

4. Conduit element according to claim if 2 wherein:

said bellows has a barrel-shaped enveloping curve.

5. Conduit element according to claim 1 wherein:

one layer of said bellows has a wall having a maximal wall thickness of maximally 0.4 mm.

6. Conduit element according to claim 5 wherein:

the one layer has a thickness of 0.20 to 0.3 mm.

7. Conduit element according to claim 1 wherein:

said bellows has multiple layers with one layer of said bellows having a wall thickness of maximally 0.25 mm.

8. Conduit element according to claim 7 wherein:

the wall thickness of a said one layer ranges between 0.10 and 0.20 mm.

9. Conduit element according to claim 3 wherein:

the ratio of height to graduation ranges between 0.6 and 0.7mm.

10. Conduit element according to claim 3, wherein:

an extension of a loop in a direction of an axis of said bellows is no larger than a pitch of said bellows in correspondence with an axial central spacing between two successive wave crests.

11. Conduit element according to claims 3, wherein:

said metallic knit jacket has U-shaped loops and an indentation in a base of said loops.

12. Conduit element according to claim 1, wherein:

a depth of penetration of said metallic knit jacket between wave crests of said bellows is no more than 30% of a profile height of said bellows.

13. Conduit element according to claim 12 wherein:

the depth of penetration of said metallic knit jacket is between 15 and 25% of the profile height of said bellows.

14. Conduit element according to claims 1, wherein:

an additional weight of said knit jacket is maximally 15% of a weight of said bellows.

* * * * *